United States Patent [19]

Covington, Jr. et al.

[11] 4,408,038
[45] Oct. 4, 1983

[54] IN-LINE COAGULATION PROCESS FOR FLUOROELASTOMER EMULSIONS

[75] Inventors: Robert A. Covington, Jr.; Okan M. Ekiner, both of Wilmington, Del.

[73] Assignee: E. I. Du Pont de Nemours & Co., Wilmington, Del.

[21] Appl. No.: 363,377

[22] Filed: Mar. 29, 1982

[51] Int. Cl.³ .............................................. C08F 6/22
[52] U.S. Cl. .................................. 528/485; 528/492; 528/502
[58] Field of Search ................... 528/485, 492, 502

[56] References Cited

U.S. PATENT DOCUMENTS

| | | | |
|---|---|---|---|
| 2,366,460 | 1/1945 | Semon | 260/84.5 |
| 2,371,722 | 3/1945 | Wanderer | 18/48 |
| 2,378,732 | 6/1945 | Semon et al. | 260/23 |
| 2,408,128 | 9/1946 | Squires et al. | 260/96 |
| 2,647,103 | 7/1953 | Griffith et al. | 260/63 |
| 2,654,730 | 10/1953 | Moll | 260/87.7 |
| 2,915,489 | 12/1959 | White | 260/33.6 |
| 2,968,649 | 1/1961 | Pailthorp et al. | 260/80.5 |
| 3,051,677 | 8/1962 | Rexford | 260/29.6 |
| 3,108,983 | 10/1963 | Barclay | 260/33.6 |
| 3,179,380 | 4/1965 | Drayer | 259/8 |
| 3,245,970 | 4/1966 | Drayer | 260/91.7 |
| 3,248,455 | 4/1966 | Harsch et al. | 260/879 |
| 3,286,992 | 11/1966 | Armeniades et al. | 259/4 |
| 3,498,935 | 3/1970 | Noble et al. | 260/2.5 |
| 3,536,683 | 10/1970 | Bailor et al. | 260/87.7 |
| 3,598,794 | 8/1971 | Nersasian | 260/80.76 |
| 3,635,444 | 1/1972 | Potter | 259/4 |
| 3,664,638 | 5/1972 | Grout et al. | 259/4 |
| 3,675,901 | 7/1972 | Rion | 259/4 |
| 3,704,006 | 11/1972 | Grout et al. | 259/4 |
| 3,752,789 | 8/1973 | Khan | 260/47 |
| 3,861,652 | 1/1975 | Clark et al. | 259/4 |
| 3,876,616 | 4/1975 | Tang | 260/47 |
| 3,997,705 | 12/1976 | Trautvetter | 526/27 |
| 4,035,565 | 7/1977 | Apotheker et al. | 526/249 |
| 4,132,845 | 1/1979 | Covington et al. | 528/499 |
| 4,302,377 | 11/1981 | Gurak et al. | 260/29.7 |

Primary Examiner—Stanford M. Levin

[57] ABSTRACT

In-line continuous coagulation and agglomeration of fluoroelastomers produced by emulsion polymerization permits direct processing of fluoroelastomer latex into mechanical dewatering devices. Coagulant is injected into the fluoroelastomer latex countercurrent and under high pressure atomization and residence time prior to mechanical dewatering is controlled.

8 Claims, 1 Drawing Figure

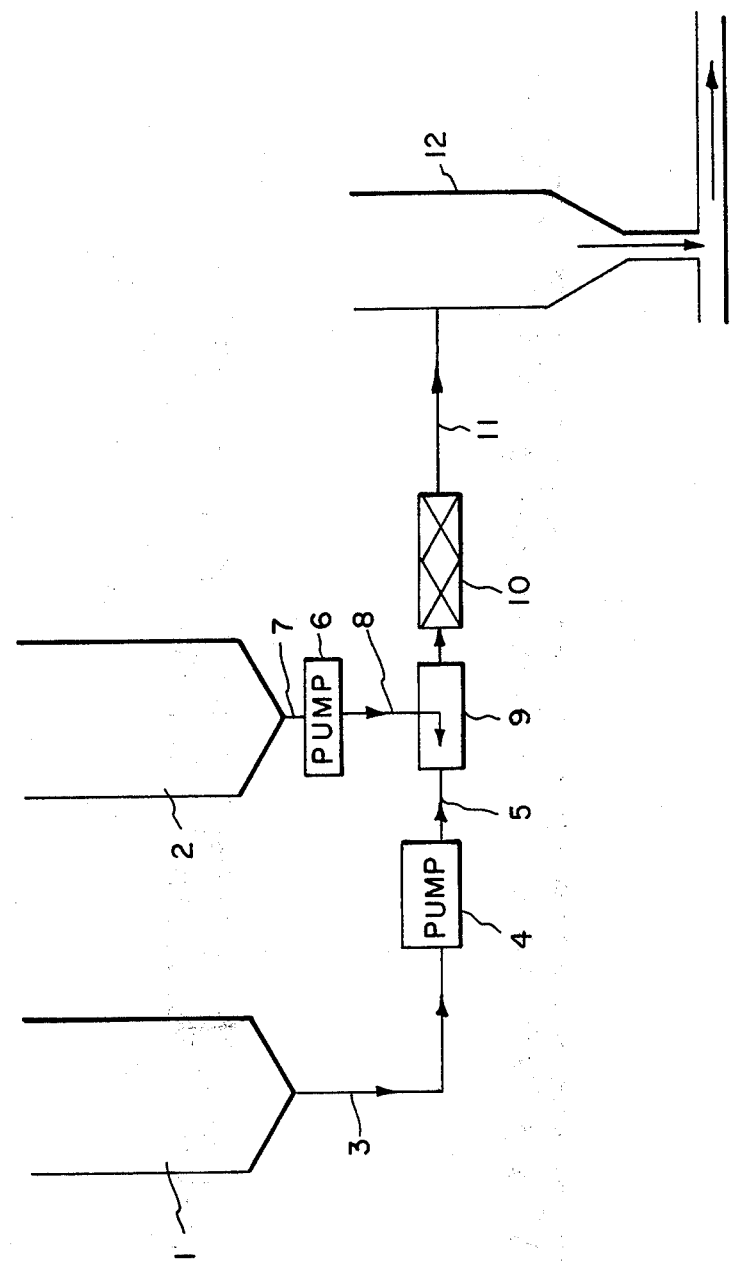

IN-LINE COAGULATION PROCESS FOR FLUOROELASTOMER EMULSIONS

DESCRIPTION

1. Technical Field

This invention relates to the preparation of certain fluoroelastomers, in particular to the in-line, continuous coagulation and agglomeration of fluoroelastomers produced by emulsion polymerization techniques. Fluoroelastomer latex processed by the present invention results in a process stream containing fluoroelastomer agglomerates of sufficient particle size that the resulting process stream can be fed directly to a mechanical dewatering device without further processing or handling, thus greatly improving process efficiency and product consistency and quality.

2. Background

U.S. Pat. No. 3,051,677, granted Aug. 28, 1962 to Rexford discloses certain fluoroelastomers derived from vinylidene fluoride and hexafluoropropylene monomers.

U.S. Pat. No. 2,968,649, granted Jan. 17, 1961 to Pailthorp et al. discloses certain fluoroelastomers derived from vinylidene fluoride, hexafluoropropylene, and tetrafluoroethylene monomers.

U.S. Pat. No. 4,035,565, granted July 12, 1977 to Apotheker et al. discloses certain fluoroelastomers derived from vinylidene fluoride, hexafluoropropylene, and tetrafluoroethylene and bromotrifluoroethylene monomers.

The fluoroelastomers in the references cited above have heretofore generally been coagulated and agglomerated in processes such as disclosed in U.S. Pat. No. 3,536,683, granted Oct. 27, 1970 to Bailor et al. These fluoroelastomers are typical of the fluoroelastomers that can be coagulated and agglomerated by the process of the present invention.

U.S. Pats. 2,366,460 and 2,378,732, granted Jan. 2 and June 19, 1945, respectively, to Semon and Semon et al., respectively, disclose apparatus and processes for coagulating synthetic rubber latex; however these references are concerned with the preparation of a small particle size coagulum, not the agglomeration of elastomer particles to a large particle size suitable for use in a mechanical dewatering device as described with following reference.

U.S. Pat. No. 4,132,845, granted Jan. 2, 1979 to Covington et al., discloses a mechanical dewatering device for use with fluoroelastomers such as described in U.S. Pats. 3,051,677; 2,968,649, and 4,035,565 cited above, and which can be advantageously used in combination with present invention.

DISCLOSURE OF THE INVENTION

This invention relates to an improved process for the preparation of certain fluoroelastomers, the improved process being one in which a slurry of said fluoroelastomers resulting from emulsion polymerization is treated by means of the process of the present invention to coagulate and agglomerate the fluoroelastomer to prepare agglomerates of large particle size, such that the resulting process stream can be passed directly to and successfully treated by a mechanical dewatering device such as is disclosed in U.S. Pat. No. 4,132,845. More specifically, the present invention relates to the in-line and continuous treatment of a fluoroelastomer latex containing process stream resulting from the emulsion polymerization of monomers such as vinylidene fluoride, hexafluoropropylene, tetrafluoroethylene and bromotrifluoroethylene (such as described in U.S. Pat. Nos. 3,051,677; 2,968,649, and 4,035,565, said treatment comprising (a) injecting a coagulant solution into said process stream, said injection being done under high pressure atomization conditions and further being countercurrent to the direction of flow of the process stream, preferably (b) mixing the process stream containing added coagulant solution under low shear mixing conditions, and (c) controlling the residence time of the process stream/coagulant solution mixture prior to passing the mixture into a mechanical dewatering device. Steps (a) and (c) are important to the successful operation of the process of the present invention. Step (b) is important to the operation of the process of the present invention under optimum conditions.

It is important to inject the coagulant solution into the fluoroelastomer latex process stream under high pressure atomization conditions countercurrent to the direction of flow of the process stream to promote intimate mixing of the coagulant solution with the fluoroelastomer latex as quickly and efficiently as possible while maintaining conditions in the process stream that are consistent with the production of fluoroelastomer agglomerates having large agglomerate particle size, i.e. an average particle size of at least 1 mm in diameter. It should be understood that, even with the efficient mixing provided by countercurrent, high-pressure, atomized injection of coagulant, there will be an agglomerate particle size distribution, with some particles being as small as ½ mm. High pressure atomized injection of the coagulant solution promotes an even dispersion of the coagulant solution in the process stream and miximizes the surface area of the coagulant solution droplets, thus promoting rapid and efficient contact of the coagulant solution with the fluoroelastomer particles in the process stream. Injection of the coagulant solution countercurrent to the direction of flow of the process stream is essential to achieve thorough mixing with gentle agitation and minimizes channelling of the coagulant solution in the fluoroelastomer latex.

Coagulant solutions suitable for use in the process of the present invention include those described in U.S. Pat. Nos. 3,536,683 and 3,598,794, granted Oct. 27, 1970 and Aug. 10, 1971, respectively to Bailor et al. and Nersasian et al. Preferred coagulant solutions include aqueous solutions of potassium aluminum sulfate (i.e. $KAl(SO_4)_2$) or triethylenetetramine. When potassium aluminum sulfate is the coagulant, it is preferred to use a 2.5–4.5% (by weight) alum solution injected at a rate of about ½–5 parts (by weight) per 100 parts (by weight) of dry fluoroelastomer, preferably about 1 part alum per 100 parts fluoroelastomer. When triethylenetetramine is used, concentration will be about 0.04–10.0% and the rate of addition will be about 0.25–2.5 parts (by weight) of coagulant per 100 parts of dry fluoroelastomer. In addition, it is preferred that the alum solution be warmed to about 40°–90° C. to prevent crystallization and minimize the possibility of clogging the injection nozzle. The coagulant solution should be injected at a pressure difference (i.e. the difference between the pressure of the coagulant solution process stream and the fluoroelastomer latex process stream) of at least 200 p.s.i. (1.38 MPa). Pressure differences of as much as 1500–2000 p.s.i. (10.33–13.78 MPa) can be used depending on the process equipment available (pumps and nozzles), but practical considerations indicate a preferred pressure difference of about 300–400 p.s.i. (2.07–2.76 MPa). The atomization device can be selected from commercially available atomizing nozzles, such as Spray Systems "Unijet T-2501".

It is important to achieve optimum conditions in the process of the present invention that the mixture of coagulant solution and fluoroelastomer latex be subjected to low shear mixing, such as would be accomplished with flow dividers or baffles inclined slightly from the direction of flow in the process stream. Relatively low shear, low agitation and low turbulence must be maintained to prevent breakdown of the particle size of the fluoroelastomer agglomerates produced during the mixing of the atomized coagulant solution with the fluoroelastomer slurry. Thus any mixing device that creates high shear, high agitation or high turbulence, such as would result from impellered devices such as a stirred tank would not be suitable for use in the present invention. Even stationary mixing devices may be unsuitable for use in the process of the present invention if the passages are narrow, the linear velocity of the process stream through such passages is high, and accordingly the level of turbulence is high. Such conditions would promote the breakdown of the fluoroelastomer agglomerates into particles of smaller size and render the resulting process stream unsuitable for direct feeding into mechanical dewatering devices, such as disclosed in U.S. Pat. No. 4,132,845. Suitable low shear mixing devices include flow dividers or baffles aligned substantially parallel to the direction of flow of the process stream. The precise configuration, number, shape and dimensions of the flow dividers and baffles will depend on the agglomeration tendency of the coagulant/fluoroelastomer mixture and the amount of pressure drop that can be tolerated in the processing equipment. The low shear mixing device used in the process of the present invention maintains the intimate mixing of the coagulant solution with the fluoroelastomer. The low shear mixing device will prevent channelling, disrupt laminar flow patterns and insure contact of coagulant solution with substantially all of the fluoroelastomer particles in the slurry, without causing breakdown of the large fluoroelastomer agglomerates produced during the first step of the present invention, or during the second step, i.e. low shear mixing. Thus particle size of the fluoroelastomer will continue to increase during the low shear mixing step.

Depending on the particular fluoroelastomer being processed and the coagulant solution being used, the low-shear mixing step can be eliminated, provided the coagulant solution/fluoroelastomer slurry mixture is permitted sufficient residence time prior to mechanical dewatering to insure thorough mixing and sufficient agglomeration so that the average particle size of the fluoroelastomer agglomertes is at least 1 mm in diameter. Thus, if the fluoroelastomer is of relatively low viscosity and accordingly tends to agglomerate quickly, if the coagulant solution has relatively high coagulation strength and capacity, if the process stream conduit between the coagulant injection port and the mechanical dewatering device is relatively long, and if the pump transmitting the fluoroelastomer slurry process stream is capable of generating relatively high pressure sufficient to transmit the fluoroelastomer process stream with fluoroelastomer agglomerates contained therein through the relatively long lengths of pipe necessary to provide a long residence time, then in these instances, the low shear mixing device can be eliminated. In any event, the process can be run more efficiently (i.e. with shorter residence times, less pipe, lower capacity slurry pumps, etc.) by using a low shear mixing device, such as described above, situated immediately downstream of the coagulant injection port. If the fluoroelastomer is of extremely low viscosity, such as the fluoroelastomer used in Example 1 below, and the coagulant is one having high coagulation strength, such as triethylenetetramine, it is preferred not to use any low shear mixing device.

Finally, it is important to control residence time according to the type, temperature and solids content of the fluoroelastomer latex, the type, concentration and quantity of the coagulant solution, the dimensions of pipe and capacity of pumps in the process equipment, the flow rate of the process stream, and whether a low shear mixing device as described above is used. Preferably, there should be means for adjustably and precisely controlling the residence time of the coagulant solution/fluoroelastomer mixture between the coagulant injection port and the mechanical dewatering device. The precise control of the residence time prevents fouling, which frequently occurs during batch coagulation of fluoroelastomer.

As a practical matter, residence time will usually be limited to no more than 2 minutes. Longer times require extremely long process stream conduits, and accordingly, extremely high pump pressures to transport the latex and agglomerates through the great lengths of pipe. A conventional emulsion pump normally creates a pressure of about 120 p.s.i. (0.83 MPa), and the mechanical dewatering device normally operates at about 70 p.s.i. (0.48 MPa) hydraulic pressure. Thus, the pressure drop through the process pipe is normally limited to about 50 p.s.i. (0.34 MPa), thus requiring relatively short pipe lengths and accordingly, relatively short residence time. In addition to economic considerations, longer residence times, and the necessary longer pipes, increase the risk of clogging. When a low shear mixing device is used, residence times will generally be about 10–30 seconds. Residence times of ten seconds or less will ordinarily require the use of a low shear mixing device. If no low shear mixing device is used, residence times of at least 30 seconds will generally be required.

BRIEF DESCRIPTION OF THE DRAWING

The FIGURE is a schematic illustration of the preferred process of the present invention and the apparatus used in that process, as the present invention was practiced in the following examples and as relates to the coagulation and agglomeration of the polymers described in U.S. Pat. Nos. 3,051,677; 2,968,649 and 4,036,565.

Referring to the FIGURE, tanks 1 and 2 contain fluoroelastomer slurry and coagulant solution, respectively. In actual commercial production equipment, tank 1, could be replaced by a pipe leading directly from the emulsion polymerization production equipment used in the preparation of the fluoroelastomer latex. Fluoroelastomer latex is transferred from the tank 1, via a pipe 3, to a conventional emulsion pump 4, capable of producing a pressure of about 120 p.s.i. (0.83 MPa). Similarly, coagulant solution is transferred from tank 2, via a pipe 7, to a pump 6, capable of producing a pressure of about 400–500 p.s.i. (2.76–3.44 MPa). Fluoroelastomer latex is pumped through pipe 5, to the location of the coagulant solution injection port. Similarly, coagulant solution is pumped through pipe 8, to the coagulant solution injection port. At the coagulant solution injection port 9, coagulant solution is injected countercurrent to the direction of flow of the fluoroelastomer latex process stream through an atomizing nozzle, such as a Spray Systems "Unijet T-2501", which was used in the following examples. Immediately downstream from the coagulant solution injection port is a low shear mixing device, 10. In the apparatus used in the following examples, the low shear mixing device 10 comprised two sets of flow dividers, each set containing 4 dividers, which dividers comprised baffles positioned radially from the axis of the pipe in which the dividers are located, the flow dividers further being positioned substantially parallel to the direction of flow of the fluoroelastomer latex/coagulant solution mixture, the downstream end of each baffle being slightly curved or inclined slightly oblique to the direction of flow of the process stream, to impart a slight back pressure and a slight mixing effect to the process stream. The second set of flow dividers is positioned immediately downstream from the first set of flow dividers, and is positioned similarly to the first set of dividers, except the baffles are rotated about the axis of the process stream conduit about 45°, (i.e. a cross-sectional view would appear as a pie divided into 8 slices) so that the process stream will be gently divided into eight approximately equal segments, each receiving some slight back pressure and mixing effect. The fluoroelastomer latex/coagulant solution mixture containing fluoroelastomer agglomerates then flows through pipe 11, which is of a predetermined length to effect a controlled residence time, to a mechanical dewatering device 12, such as described in U.S. Pat. No. 4,132,845. Where a particular situation requires flexibility in the process equipment with respect to residence time, this is most conveniently accomplished by having a plurality of alternative coagulant solution injection ports which are spaced at various positions along the pipe 11, whereby choosing the appropriate port, one can also choose the appropriate residence time for the particular process parameters and fluoroelastomer being processed. In the following examples, pipe 11, was about 208" (5.28 m) in length with an inside diameter of 1½" (38.1 mm). The pipe included two injection ports, one at the beginning of the pipe or 208" (5.28 m) from the mechanical dewatering device, and the other at 152" (3.86 m) from the first injection port or 56" (1.42 m) from the mechanical dewatering device. Two sets of flow dividers substantially as described above were positioned immediately downstream of the first injection port. No flow dividers were downstream of the second injection port. The baffles in each of the flow dividers were approximately 1" (25 mm) in length, and had a slight curvature at the downstream end of each baffle. The dewatering device 12, was substantially as described in U.S. Pat. No. 4,132,845.

The experiments described in the following examples were all conducted in an experimental facility which was operated substantially as desired above. In each of the following examples, parts and percentages are by weight and temperature are in degrees Celsius unless otherwise specified.

EXAMPLE 1

Using the apparatus shown in the Figure and described in detail above, a 60% by weight vinylidene fluoride/40% by weight hexafluoropropylene fluoroelastomer having a polymer viscosity (ML-10) of 10 at 10° C. was successfully coagulated and agglomerated with triethylenetetramine according to the process of the present invention. Coagulant solution was injected at the second injection port, and no low shear mixing device was used. Process parameters were as follows:

| | |
|---|---|
| Emulsion, % solids | 23 |
| Emulsion Flow Rate, kg/hr | 257–388 |
| Polymer Flow Rate, kg/hr | 59–88 |
| Emulsion Temperature, °C. | 50–65 |
| Coagulant Solution Concentration, % | .06–.08 |
| Coagulant Solution Rate, kg/hr | 59–68 |
| Coagulant Temperature, °C. | 50–60 |
| Coagulant to Polymer Ratio | .0006 |
| Slurry Residence Time Before Dewatering, sec | 13–20 |

EXAMPLE 2

Using the apparatus shown in the Figure and described in detail above, a 25% by weight tetrafluoroethylene/30% by weight hexafluoropropylene/45% by weight vinylidene fluoride fluoroelastomer having a polymer viscosity (ML-10) of 72 at 121° C. was successfully coagulated and agglomerated with potassium aluminum sulfate (KAl(SO$_4$)$_2$) according to the process of the present invention. Coagulant solution was injected at the first injection port and flow dividers were used. Process parameters were as follows:

| | |
|---|---|
| Emulsion, % solids | 19 |
| Emulsion Flow Rate, kg/hr | 342–590 |
| Polymer Flow Rate, kg/hr | 65–112 |
| Emulsion Temperature, °C. | 62–68 |
| Coagulant Solution Concentration, % | 3.4 Anhydrous basis |
| Coagulant Solution Rate, kg/hr | 31–46 |
| Coagulant Temperature, °C. | 43–67 |
| Coagulant to Polymer Ratio | .018–.027 anhydrous basis |
| Slurry Temperature, °C. | 60–64 |
| Slurry Residence Time Before Dewatering, sec | 70–40 |

EXAMPLE 3

Using the apparatus shown in the Figure and described in detail above, a 60% by weight vinylidene fluoride/40% by weight hexafluoropropylene fluoroelastomer having a polymer viscosity (ML-10) of 65° at 100° C. was successfully coagulated and agglomerated with potassium aluminum sulfate according to the process of the present invention. Coagulant solution was injected at the second injection port and no low shear mixing device was used. Process parameters were as follows:

| | |
|---|---|
| Emulsion, % solids | 13.8 |
| Emulsion Flow Rate, kg/hr | 494–658 |
| Polymer Flow Rate, kg/hr | 68–91 |
| Emulsion Temperature, °C. | 63–65 |
| Coagulant Solution Concentration, % | 3.4 Anhydrous basis |
| Coagulant Solution Rate, kg/hr | 42–59 |
| Coagulant Temperature, °C. | 90–93 |
| Coagulant to Polymer Ratio | .026–.028 anhydrous basis |
| Slurry Temperature, °C. | 54–80 |
| Slurry Residence Time Before | 49–36 |

EXAMPLE 4

Using the apparatus shown in the Figure and described in detail above, a 35% by weight vinylidene fluoride/29% by weight tetrafluoroethylene/34% by weight hexafluoropropylene/2% by weight bromotetrafluorobutene fluoroelastomer having a polymer viscosity (ML-10) of 65 at 121° C. was successfully coagulated and agglomerated with potassium aluminum sulfate according to the process of the present invention. Coagulant solution was injected at the second injection port, and no low shear mixing device was used. Process parameters were as follows:

| | |
|---|---|
| Emulsion, % solids | 20 |
| Emulsion Flow Rate, kg/hr | 320–636 |
| Polymer Flow Rate, kg/hr | 64–127 |
| Emulsion Temperature, °C. | 60–62 |
| Coagulant Solution Concentration, % | 3.4 Anhydrous basis |
| Coagulant Solution Rate, kg/hr | 39–50 |
| Coagulant Temperature, °C. | 80–82 |
| Coagulant to Polymer Ratio | .027–.017 anhydrous basis |
| Slurry Temperature, °C. | 52–54 |
| Slurry Residence Time Before Dewatering, sec | 73–38 |

Industrial Applicability

The process of the present invention can be used to coagulate and agglomerate fluoroelastomer slurries produced by emulsion polymerization such as disclosed in U.S. Pat. Nos. 3,051,677; 2,968,649 and 4,035,565, resulting in the production of a process stream containing fluoroelastomer particles of large particle size suitable for direct feeding into a mechanical dewatering apparatus such as described in U.S. Pat. No. 4,135,845. The resulting polymers are useful in the production of gaskets, seals, tubing, o-rings, roll covers, hose linings and various molded articles where superior resistance to environmental attack is required.

Best Mode

Although the best mode of the present invention, i.e. the single best set of process parameters of the present invention, will depend upon the particular polymer being processed and the particular equipment in which the processing takes place, the most preferred processes for each of the various polymers described is as described in detail in each of the respective examples.

We claim:

1. A process for coagulating and agglomerating fluoroelastomer particles to prepare agglomerates of large particle size in a fluoroelastomer slurry process stream, which process stream containing the resultant large fluoroelastomer agglomerates is then passed to a dewatering device, the process comprising
   (a) continuously injecting a coagulant solution under high pressure atomization into and countercurrent to the direction of flow of the fluoroelastomer slurry process stream, said coagulant solution being injected at a pressure of at least 1.38 MPa greater than the pressure of the fluoroelastomer slurry process stream, thereby creating a cogulant solution/fluoroelastomer slurry mixture, and
   (b) maintaining the mixture under conditions of low shear and low turbulence for a predetermined amount of time subsequent to the injection of coagulant solution and prior to the mechanical dewatering, thereby forming agglomerated fluoroelastomer particles of large particle size.

2. The process of claim 1 wherein the coagulant solution is selected from the group consisting of potassium aluminum sulfate and triethylenetetramine.

3. The process of claim 2 wherein the coagulant is potassium aluminum sulfate and is injected at a rate of ½–5 parts of coagulant by weight per 100 parts by weight of dry fluoroelastomer.

4. The process of claim 3 wherein the concentration of the coagulant in the coagulant solution is 2.5–4.5% by weight.

5. The process of claim 2 where the coagulant is triethylenetetramine and is injected at a rate of 0.25–2.5 parts by weight of coagulant per 100 parts of dry fluoroelastomer.

6. The process of claim 5 where the concentration of the coagulant in the coagulant solution is 0.04–10% by weight.

7. The process of claim 1 wherein the coagulant solution/fluoroelastomer slurry mixture is passed through a low shear mixing device selected from the group consisting of flow dividers and baffles.

8. The process of claim 1 wherein the predetermined amount of time is between 10–70 seconds.

* * * * *